L. H. NASH.
METER PISTON.
APPLICATION FILED FEB. 16, 1907.
1,050,037.
Patented Jan. 7, 1913.
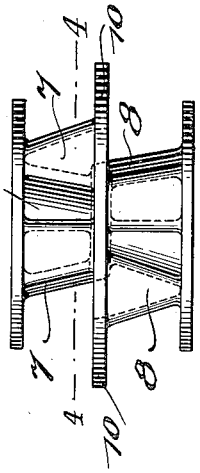
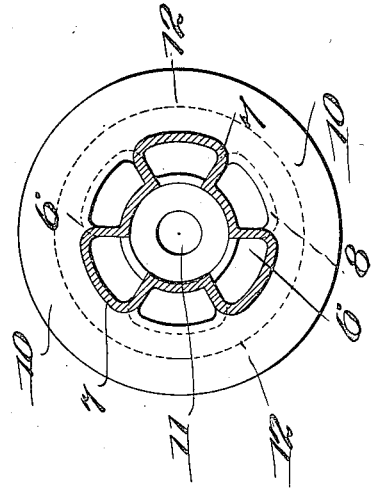
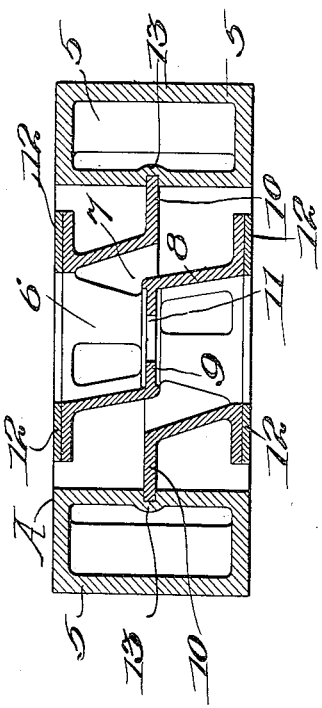
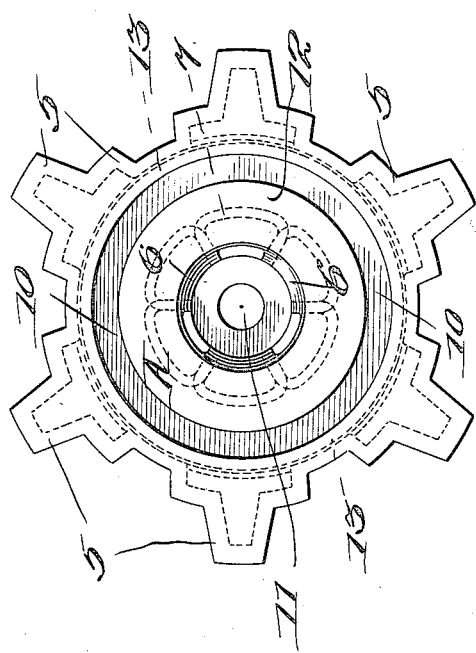

UNITED STATES PATENT OFFICE.

LEWIS HALLOCK NASH, OF SOUTH NORWALK, CONNECTICUT.

METER-PISTON.

1,050,037. Specification of Letters Patent. Patented Jan. 7, 1913.

Application filed February 16, 1907. Serial No. 357,671.

*To all whom it may concern:*

Be it known that I, LEWIS HALLOCK NASH, a citizen of the United States, and a resident of South Norwalk, in the county of Fairfield and State of Connecticut, have invented certain new and useful Improvements in Meter-Pistons, of which the following is a specification.

This invention relates to meter pistons and particularly an improvement on a rotary piston meter commonly known as "Crown."

The invention consists in the construction, combination and arrangement of parts set forth in and falling within the scope of the appended claims.

In the accompanying drawings wherein I have illustrated the preferred embodiment of my invention, Figure 1 is a transverse vertical, sectional view taken through a piston embodying my invention; Fig. 2 is a top plan view of the piston; Fig. 3 is a view in side elevation of the spider or skeleton of the piston; Fig. 4 is a horizontal sectional view taken on the line 4—4 of Fig. 3.

In the meter of the type commonly known as the Crown meter, it has heretofore been customary to use in connection therewith a piston involving in its construction a suitable amount of rubber, the use of which possesses certain disadvantages, as it affords the liability of too much expansion, thus interfering with the operation and accuracy of the meter. In the present instance it is my purpose to avoid such a disadvantage by dispensing with the employment of a relatively large body of rubber and using in place thereof a suitable substance, such as a metal which will not be subject to the expansion and to distortion such as referred to above.

Referring now to the accompanying drawings in detail, A indicates the piston as an entirety, and such piston is adapted to be used in connection with such a meter as is above referred to, that is to say, the Crown type of meter. This piston comprises an outer portion 5 preferably formed of hard rubber, such portion being of a well known construction.

The numeral 6 designates as an entirety the web of the piston, and such web is formed preferably of two sections or members 7 and 8 of any suitable metal, such as brass. These sections are connected, being preferably formed integral at the central portion 9 of the web and at the point of union the widened portion 10 results. Through this central portion is formed the opening 11 for the passage of the registering spindle. The edge of the outermost face of each of said sections 7 and 8 lies inwardly a distance from the inner surface of the outer portion 5, said outermost faces being in planes below the upper and lower horizontal faces. The outer portion 5 and each of such faces of the said sections 7, 8 is provided with a sheet or facing 12 of hard rubber or other suitable anti-friction material, suitably united to the metal of the web, the thickness of such facing or sheet of rubber being such as to cause its upper surface to lie in the same plane as the adjacent horizontal surface of the outer part 5.

The piston is provided with an approximately centrally arranged, annular groove 13 in which seats the periphery of the diaphragm 10, forming the central portion of the piston, so that the web is firmly united to the outer part of the piston, and a structure embodying the desired features of stability and rigidity is obtained.

The central portion 6 of the piston is formed with a plurality of ports opening into passages extending outwardly from the central diaphragm 10, the passages communicating with the spaces between the parts 7, 8 of said portion 6 and the inner face of the part 5, the said passages which extend in one direction being offset or out of line with the passages which extend in the opposite direction. The diaphragms are connected by means of the body of the part 6 and the walls forming said passages.

As heretofore stated the portion 5 of the meter is formed preferably of hard rubber, but I do not desire to be limited alone to hard rubber as the invention contemplates other non-metallic material suitable for the purpose.

Having thus described my invention, what I desire to secure by Letters Patent is:—

1. A piston for a rotary water meter formed of non-metallic material, combined with a metallic interior skeleton formed with ports and passages for controlling the flow of the liquid.

2. A piston for a rotary water meter formed of non-metallic material and having a central opening, and a metallic interior skeleton secured in said opening and formed with ports and passages for controlling the flow of the liquid.

3. A piston, comprising an outer body portion provided with a groove, and a web portion formed of a metallic body having a widened diaphragm seated in the groove formed in the outer portion, and a facing of anti-friction material for each of the outer faces of the web.

4. A rotary piston comprising a web portion formed of two sections united at the center of the web portion, a diaphragm at the point of junction of said sections provided with ports, each of said sections being provided with passages extending from certain of said ports, the passages of one section being offset with respect to the passages of the other section.

5. A piston comprising a central portion having a plurality of diaphragms provided with ports, one of said diaphragms being a widened central diaphragm.

6. A piston, comprising a central portion having a widened diaphragm provided with a plurality of ports, the central portion being provided with a plurality of passages extending oppositely from said ports.

7. A piston comprising a central portion having a plurality of outer diaphragms and a central widened diaphragm, and provided with a plurality of ports, one of said ports extending between one of said outer diaphragms and said central diaphragm and a second of said ports extending between said central diaphragm and a second of said outer diaphragms.

8. A piston for a rotary water meter formed of non-metallic material combined with a metallic interior skeleton consisting of a plurality of diaphragms, said diaphragms having ports and passages for the flow of the liquid.

9. A piston for a rotary water meter formed of non-metallic material combined with a metallic interior skeleton consisting of a plurality of diaphragms, said diaphragms having ports and passages for the flow of the liquid, one of said diaphragms being connected to the piston, and the others free therefrom but supported by the diaphragm which is connected to the piston.

10. A piston for a rotary water meter formed of non-metallic material combined with a metallic interior skeleton consisting of a plurality of diaphragms, said diaphragms having ports and passages for the flow of the liquid, one of said diaphragms being of greater diameter than the others and secured to the piston, the diaphragms of lesser diameter having their edges removed from the piston to provide for the passage of liquid.

11. A piston for a rotary water meter formed of non-metallic material combined with a metallic interior consisting of a plurality of diaphragms, one being arranged centrally of the piston and connected thereto and the others being separate from the piston but supported from said central diaphragm.

12. A piston for a rotary water meter formed of non-metallic material and having a central opening combined with a metallic interior skeleton consisting of a plurality of diaphragms located in said opening and having provision for the flow of liquid, one of said diaphragms being connected to the piston body throughout its circumference, and the other diaphragms being free from the piston body throughout their circumferences.

In testimony whereof I have hereunto signed my name to this specification in the presence of two subscribing witnesses.

LEWIS HALLOCK NASH.

Witnesses:
R. B. CAVANAGH,
JOS. J. PIERANDO.